United States Patent [19]
Warner

[11] 3,938,123
[45] Feb. 10, 1976

[54] DRIVER ALERT DEVICE

[75] Inventor: Glenfield Warner, Ville St. Laurent, Canada

[73] Assignee: Lawrence Peska Associates, Inc., New York, N.Y. ; a part interest

[22] Filed: Jan. 20, 1975

[21] Appl. No.: 542,102

[52] U.S. Cl............................ 340/279; 200/DIG. 2
[51] Int. Cl.[2]....................................... G08B 21/00
[58] Field of Search.................... 340/279; 180/99; 200/61.45 R, DIG. 2, DIG. 8

[56] References Cited
UNITED STATES PATENTS

| | | | |
|---|---|---|---|
| 3,208,062 | 9/1965 | Gregory | 340/279 |
| 3,588,864 | 6/1971 | Gaulke | 340/279 |
| 3,678,494 | 7/1972 | Setser | 340/279 |

Primary Examiner—Glen R. Swann, III
Attorney, Agent, or Firm—Jack D. Slobod

[57] ABSTRACT

Alert apparatus worn by a driver includes a motion responsive switch including a pendant wiper associated with a plurality of closely spaced contacts surrounded by an auxiliary contact. A plurality of resistors of different values are respectively coupled to different ones of the contacts for randomly placing different ones of the resistors in a circuit for charging a selected capacitor coupled to the wiper. An amplifier and switching circuit energizes an alarm when the capacitor is charged to a predetermined level and the auxiliary contact is coupled to the capacitor to enable its discharge as the wiper is accellerated against the auxiliary contact in response to deliberate shaking movement by the operator.

5 Claims, 7 Drawing Figures

DRIVER ALERT DEVICE

BACKGROUND OF THE INVENTION

The invention relates to the safety devices for motor vehicles and particularly to safety devices adapted to keep alert drivers experiencing incipient sleep or sleepiness. The prior art includes a number of apparatus which require a driver to maintain a force on a spring such as that shown in Galli, U.S. Pat. No. 2,126,878 issued Aug. 16, 1938. Setser, U.S. Pat. No. 3,594,772 discloses a condensor and relay time constant circuit which is discharged at a predetermined rate as the mode of steering the vehicle is changed. The apparatus heretofore known has not been widely accepted in part because of its relative complexity and because of its expense as well as the difficulty of installing it on a motor vehicle once it has left the factory.

Accordingly, it is a primary object of the invention to provide apparatus which is simple and inexpensive to manufacture and which may be readily used by motor vehicle operators without the necessity of major connections to the motor vehicle.

Still another object of the invention is to provide apparatus which may be installed merely by connecting to the cigarette lighter of the vehicle.

SUMMARY OF THE INVENTION

It has now been found that this and other objects of the invention may be satisfied by apparatus for keeping alert a motor vehicle operator who is drowsy which includes an audible alarm, a mechanical vibration stimulus, and a motion switch which is responsive to deliberate movements of the vehicle operator. The switch includes a plurality of contacts which are selectively connected to a pendant or hammer. Means are provided also for initiating and terminating the audible and vibratory alarm signals in response to the motion switch. The means includes a first capacitor.

Normally a plurality of resistors will be provided which are connected to contacts of the motion switch and have different resistance values. The different resistance values cause charging of the first capacitor at varying rates. In some forms of the invention is plurality of capacitors of different values may be provided and one of these capacitors may be selectively connected in place of the first capacitor. The circuit includes a field effect transistor and also a second transistor.

BRIEF DESCRIPTION OF THE DRAWING

The invention will be better understood by reference to the accompanying drawing in which.

DESCRIPTION OF A PREFERRED EMBODIMENT

Figure 1:
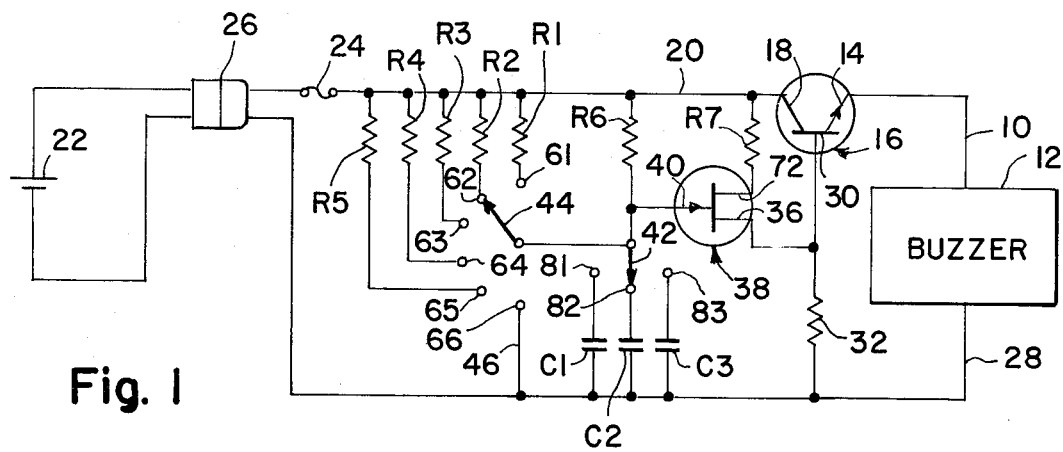
FIG. 1 is a schematic view of one form of the apparatus in accordance with the invention.
Figure 2:
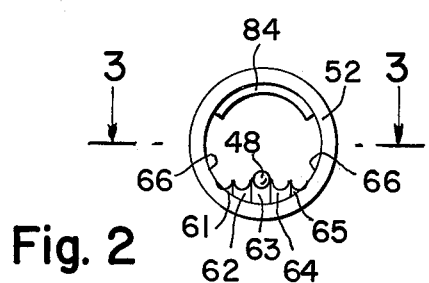
FIG. 2 is a plan view of the motion switch which is a portion of the apparatus shown in FIG. 1.
Figure 3:
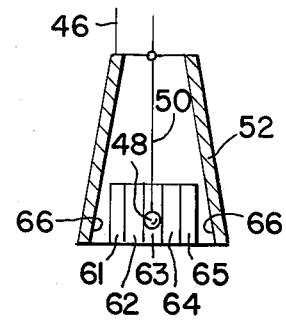
FIG. 3 is a sectional view taken through the line 3—3 of FIG. 2.
Figure 4:
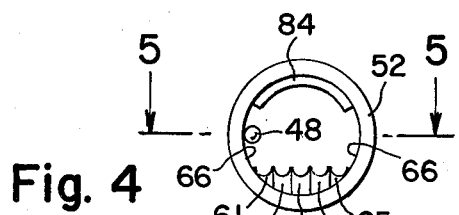
FIG. 4 is a plan view similar to that of FIG. 2.
Figure 5:
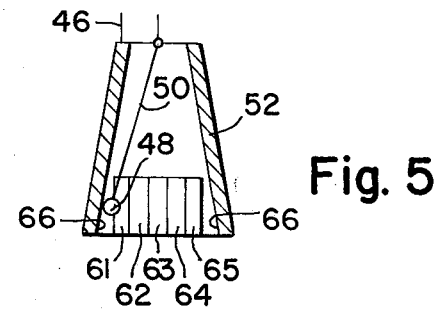
FIG. 5 is a sectional view taken through the line 5—5 of FIG. 4.

Referring now to FIG. 1 there is shown a wire 10 which is connected at one end to a buzzer 12 and at the other end to an emitter 14 of a transistor 16. The collector 18 of the transistor 16 is connected by means of a line 20 to the plus side of battery 22 by means of a fuse 24 and a cigarette lighter plug 26.

A wire 28 is connected to the other terminal of the buzzer 12 and by means of the cigarette plug 26 to the negative side of the battery 22. In most domestic cars the negative side of the battery will be at the same potential as the frame of the vehicle. The base 30 of transistor 16 is coupled by means fo a resistor 32 to the line 28. Also coupled to the base 30 is the source 36 of a field effect transistor 38. The gate 40 of the field effect transistor 38 is coupled by a switch 42 to one of the capacitors C1, C2 and C3 which are in turn coupled on one side to the line 28. Resistor R7 connects the drain 72 of field effect transistor 38 to line 20. As also will be seen in FIG. 1 the gate 40 of the field effect transistor 38 is also coupled to a resistor R6 which is connected on one end to the line 20. Also connected to the gate 40 is switch 44 which is also referred to herein as a motion switch. The motion switch selectively connects one of the resistors R1, R2, R3, R4, or R5 to the gate 40 of field effect transistor 38. Each of the resistors 1 through R5 is coupled to the line 20. An additional line 46 is provided extending to an additional contact on the switch 44 and also to the line 28.

Figure 6:
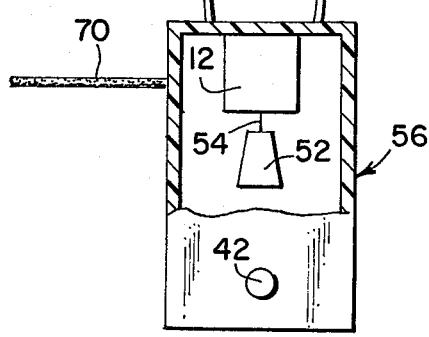
FIG. 6 is partially broken away side elevational view of the apparatus which is shown schematically in FIG. 1.
Figure 7:
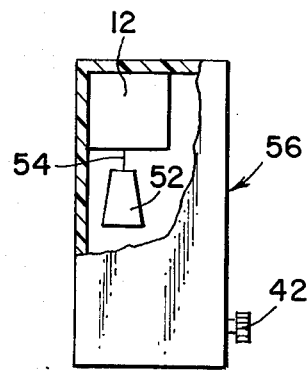
FIG. 7 is a front elevational view corresponding to a side elevational view of FIG. 6.

Referring now particularly to FIGS. 2 through 5 there is shown the motion switch 44 in greater detail. More particularly a hammer or contact 48 is carried by a conductor 50. A case 52 which is of metallic construction is suspended by a wire 54 as is best shown in FIGS. 6 and 7 as part of an assembly 56 which is normally carried by a loop 58 about the neck of the vehicle operator. Responsive to the movements of the vehicle operator the pendant 48 will move because of the effect of gravity and inertia. The motion switch includes discrete contacts 61 through 66. More specifically it will be seen that the contact 66 is the inside surface of the case 52 and it will be understood that this contact is the ground connection which is common to line 28. Ordinarily the case 52 will be suspended like a pendulum by the wire 54 from the buzzer 12 within the housing 56. A cable 70 extends from the housing 56 for connection to the cigarette lighter connection 26 to the battery 22. A switch 42 is provided for varying the sensitivity of the apparatus as well as turning it on and off.

In operation the pendant 48 may initially come to rest against the contact 61 of the motion switch 44. With the connector 26 providing power from the battery 22 depending upon the position of the switch 42 one of the capacitors C1, C2, C3 will be charged and the potential at the gate 40 of the field effect transistor 38 will rise. The voltage at the source 36 will also rise with the rising potential at the gate 40. In a similar manner the potential at the base 30 of the transistor 16 will also rise at a rate determined by the resistance value of R1. It will also be apparent to those skilled in the art that the capacitance of each of the capacitors C1, C2 or C3 which is connected by means of a switch 42 to the gate 40 of the field effect transistor 38 will also effect the rate of rise of the potential at the base 30 of the transistor 16. Increases in the potential at the base 30 of the transistor 16 will result in corresponding increases in collector current until sufficient current is passed to operate the buzzer 12. The buzzer operates with increasing strength as the collector current increases. Although not essential to the invention the incorporation of the field effect transistor 38 is particularly desirable to avoid having the base circuit of the transistor 16 load down the capacitors of the timing circuit.

It will be understood that the switch 42 which is provided to vary the sensitivity of the apparatus will connect various sizes of capacitors identified by designations C1, C2 and C3 between the gate 40 of the field effect transistor 38 and the negative side of the battery 22 through line 28. More particularly the time delays (in seconds) inherent in charging capacitor C1, C2 and C3 selectively are in one form of the invention:

| SWITCH 44 | SWITCH 42 Position 81 | SWITCH 42 Position 82 | SWITCH 42 Position 83 |
|---|---|---|---|
| Position 61 | 5 | 10 | 20 |
| Position 62 | 10 | 20 | 40 |
| Position 63 | 15 | 30 | 60 |
| Position 64 | 20 | 40 | 80 |
| Position 65 | 25 | 50 | 100 |

It will be understood that the position 66 of the switch 44 results in a short circuit to ground of capacitor C1, C2 and C3 operatively connected thereto which will immediately ground any potential across the members of the particular capacitor. It will be further understood by those skilled in the art the pendant 48 will not contact any of the contacts 61 through 68 over an angular portion of the case 52 which is covered by an insulation 84.

When the driver shakes his torso or head the pendant 48 will momentarily strike contact 66 then come to rest normally in a random manner on another of the depressions or contacts 61 through 65. The alarm signals will than gradually build up in intensity to a maximum value, unless the driver shakes his torso or head again, which removes the alarm signals and starts a new build-up. The periodic shaking of the torso or head, which the driver is required to execute in order to avoid receiving alarm signals, helps to keep him alert, along with the audible and vibratory stimuli themselves. The time constants indicated above in the table will be determined by the product of the resistance and the capitance which are operatively connected by means of switches 44 and 42. The agitation of the torso or head of the operator of the vehicle will cause the movement of pendant 48 and ordinarily will cause it to move to a different contact position 61 through 66 and initiate the charging or discharge in accordance with the operation before described. The variations and charging times for various positions of the switch 44 have been intentionally chosen to be of varying lengths of time to avoid the anticipation by the driver of when a shake is required and therefore the apparatus demands that a higher degree of alertness to avoid hearing and feeling unpleasant sounds and vibrations induced by the buzzer 12. Normally the driver will connect the apparatus when he feels drowsy or for other long periods of driving as dictated by his driving patterns and tendency to fall asleep which in turn is dependent upon his physical condition at the particular time involved.

Having thus described the invention, I claim:

1. An alarm system for keeping alert a motor vehicle operator which comprises: an alarm, a motion switch responsive to movements of the vehicle operator, and which switch includes a plurality of contacts disposed for random contact with a pendant, and means for periodically initiating and terminating operation of said alarm responsive to the position of said motion switch, said means for initiating and terminating including a first capacitor which is charged by an electric current passed through said pendent, a plurality of resistors of different value which are respectively connected to said plurality of contacts of said motion switch, said different resistance values causing charging of said first capacitor at varying rates.

2. The apparatus of claim 1 wherein said means for initiating and terminating further comprises an additional contact on said motion switch associated with said pendant, said additional contact being positioned relative to said pendant to be contacted by said pendant in response to deliberate movement of the operator, said additional contact and said pendant being coupled to said capacitor for discharging said capacitor in response to said pendent contacting said additional contact.

3. The apparatus as described in claim 2 further including a plurality of capacitors of different values and means for selectively connecting one of said capacitors in place of said first capacitor.

4. The apparatus as described in claim 3 wherein said means for periodically initiating and terminating said alarm includes a field effect transistor amplifier means fed by said selectively connecting means for amplifying the voltage across said selected capacitor.

5. The apparatus as described in claim 4 wherein said means for periodically initiating and terminating said alarm further comprises a transistor connected by its emitter and collector terminals in series with said alarm and having its base terminal coupled to said amplifier means for control of said transistor.

* * * * *